March 10, 1953     H. JENSEN     2,631,210
METER MOUNT
Original Filed April 11, 1945     2 SHEETS—SHEET 1
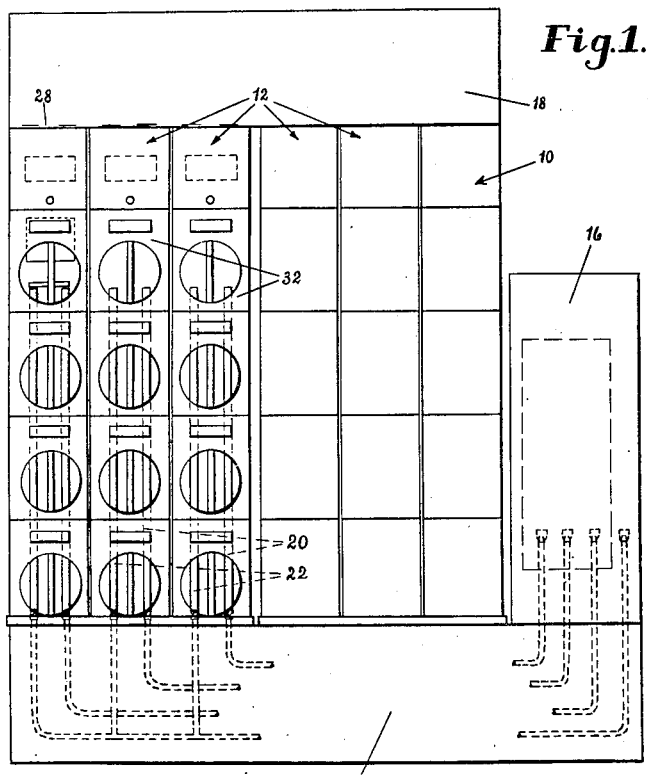
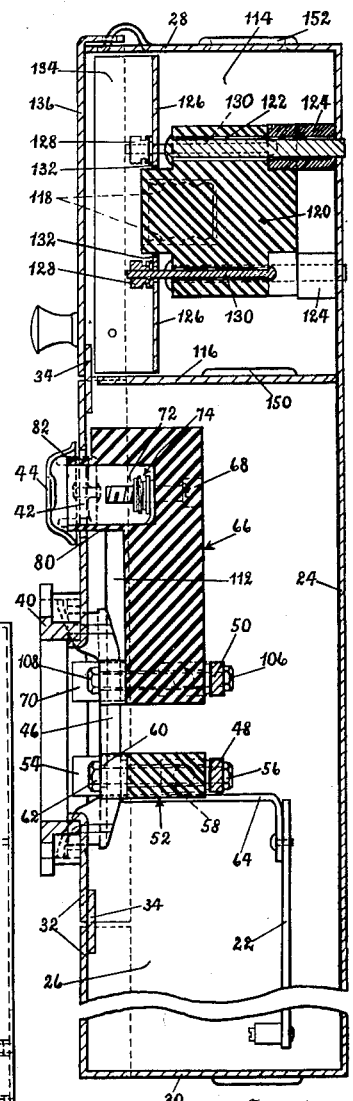
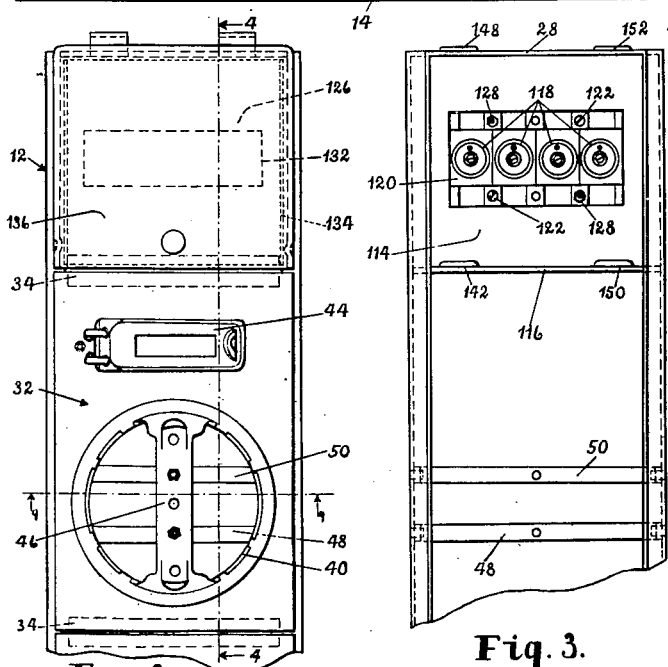
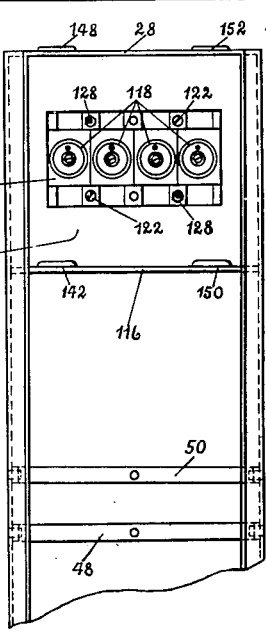
Inventor
HELGE JENSEN
By Edwin Leinoher
Attorney March 10, 1953 — H. JENSEN — 2,631,210
METER MOUNT
Original Filed April 11, 1945 — 2 SHEETS—SHEET 2
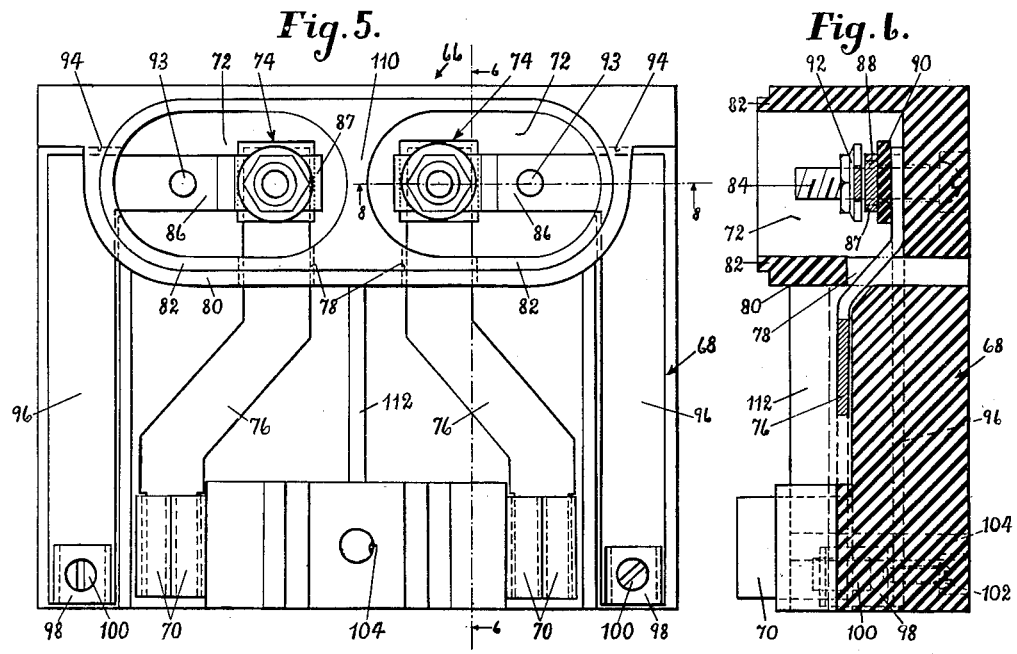
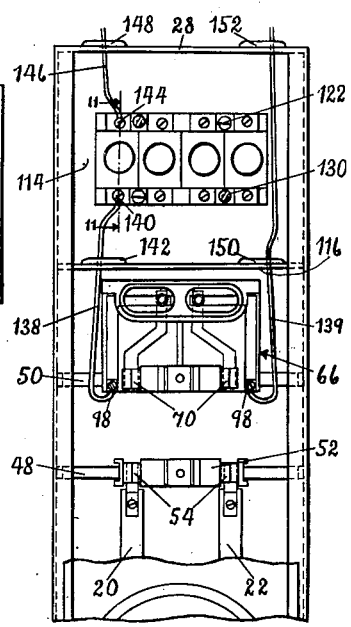
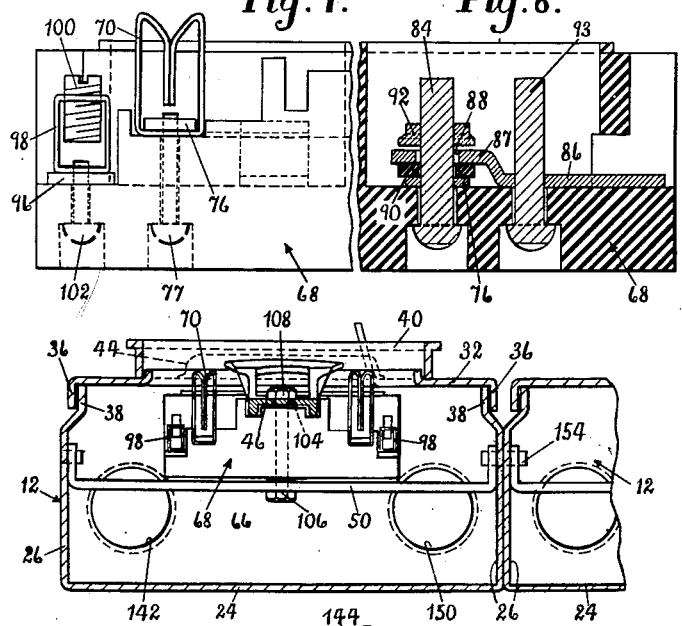
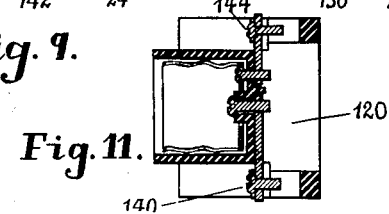
Inventor
HELGE JENSEN
By Edwin Levisohn
Attorney Patented Mar. 10, 1953

2,631,210

UNITED STATES PATENT OFFICE 2,631,210

METER MOUNT

Helge Jensen, Flushing, N. Y., assignor, by mesne assignments, to Federal Electric Products Company, Newark, N. J.

Original application April 11, 1945, Serial No. 587,808. Divided and this application October 12, 1950, Serial No. 190,570

7 Claims. (Cl. 200—158)

This invention relates to panels for electric meters and associated current conductors and current responsive devices.

One object of the invention is to provide a panel for a plurality of metered lines, the panel having provision for mounting a plurality of meters for said lines in alignment in a row and for mounting current responsive devices for said lines, respectively, at one end of the row of meters, the arrangement being such that the several conductors in the panel extend longitudinally of the panel without crossing each other.

Another object of the invention is to provide a panel unit which can be used alone or which can be assembled with one or more similar units, each unit having means for mounting current responsive devices for the metered lines, respectively, at one end of the row of meters.

A further object of the invention is to provide a meter panel or panel unit having one or more meter sockets and associated current disconnect means, respectively, with means accessible through the meter sockets for connecting the outgoing lines without requiring access to the disconnect devices.

The above and other objects, advantages and features of the invention will be more fully understood from the following description, reference being had to the accompanying illustrative drawings of a preferred embodiment of the invention.

In the drawings:

Fig. 1 is a front view of a meter panel assembly embodying the present invention;

Fig. 2 is a front view, in elevation and on a larger scale, of the upper portion of a panel unit;

Fig. 3 is a view similar to Fig. 2 with parts omitted for the purpose of illustration;

Fig. 4 is a sectional view, on a larger scale, on the line 4—4 of Fig. 2;

Fig. 5 is a front view of one of the terminal blocks utilized in each panel unit illustrated in Fig. 1;

Fig. 6 is a sectional view on the line 6—6 of Fig. 5;

Fig. 7 is a fragmentary view, in elevation, of the lower edge of the terminal block illustrated in Fig. 5;

Fig. 8 is a sectional view on the line 8—8 of Fig. 5;

Fig. 9 is a sectional view, on a larger scale, on the line 9—9 of Fig. 2;

Fig. 10 is a view similar to Fig. 3 showing a terminal block and a companion meter terminal member in position;

Fig. 11 is a detailed sectional view on the line 11—11 of Fig. 10.

Referring now to the drawings in detail, there is illustrated in Fig. 1 a meter panel assembly 10 embodying the present invention. Said assembly comprises a plurality of panel units 12 arranged in side by side relation in association with a supply line trough 14 disposed therebelow, with a service switch box 16 mounted on trough 14, and with a load side pull box 18 mounted at the upper ends of said panel units. The supply lines for the several panel units are disposed and enclosed within trough 14 for connection to the branch bus lines 20 and 22 in each panel unit. Said branch lines extend longitudinally of the panel unit and have connected thereto the meter socket input terminals which engage the input terminals of the meter when the latter is mounted in its socket.

Referring now more particularly to the construction of the meter panel unit 12, the latter comprises a metal receptacle having a rear wall 24, opposite side walls 26, an upper end wall 28, and a lower end wall 30. The front or meter mounting wall of panel unit 12 is constituted by a plurality of cover plates 32 disposed in end to end relation along the length of the panel unit, each cover plate 32 having secured to its inner surface a part 34 which projects from the lower end thereof and is overlapped by the upper end of the next lower plate for the full width thereof. Each cover plate has inturned side portions 36 which overlap the forward inwardly offset portions 38 of the side walls 26 of the panel unit (Fig. 9). Each cover plate 32 is provided with a meter socket 40 and an opening 42 for disconnect means, said last mentioned opening having a sealable cover 44 pivotally mounted at one end thereof on its companion cover plate 32. Each meter socket 40 is provided with a fixed strap 46 by which said cover plate is secured to the panel unit.

Panel unit 12 is provided with pairs of companion cross straps 48 and 50 disposed in vertically spaced relation at points longitudinally of the panel unit, there being a pair of straps 48 and 50 for each meter socket 40. As illustrated in Fig. 9 each strap 50 is secured at its opposite ends to side walls 26 of the panel unit receptacle. Each strap 48 is similarly secured at its opposite ends to walls 26. Strap 48 has secured thereto an insulation block 52 provided with clip terminals 54 for engagement by the input terminals of the meter when the latter is mounted in its socket. Said block 52 is secured in position to strap 48 by a bolt 56 which passes through an opening 58 in said block and through an opening 60 in strap 46 of socket 46, where the nut 62 of bolt 56 engages said strap for holding the latter against insulation block 52. The branch buses 20 and 22 are electrically connected to terminal clips 54 by conductor members 94. It will be understood that the terminal clips 54 of the several meter sockets are all in parallel relation with the branch buses 20 and 22. It will be observed that branch buses 20 and 22, which extend longitudinally of the panel unit receptacle, are disposed rearwardly of straps 48 and 50 and are connected to the clips 54 of terminal block 52 by forwardly projecting conductor strips 64. The other cross strap 50 of each pair of cross straps located in position at each meter socket is utilized for mounting a terminal block 66 which will now be described in further detail as it constitutes one of the important features of the present invention.

Each terminal block 66, there being one for each meter socket, comprises a molded insulation body 68 which has secured thereto a pair of spring terminal clips 70 which are engaged by the output terminals of the meter mounted in the companion socket. The upper end of block 68 is provided with a pair of separated recesses 72 in which the disconnect means 74, one for each side of the companion metered line, are disposed. As illustrated in Fig. 4, recesses 72 are disposed in alignment with the opening 42 provided in the companion cover plate 32 and are covered by a sealable closure 44. The disconnect means 74 are connected to terminal clips 70 by conductor strips 76 which project through openings 78 in the barrier wall 80. Strips 76 thus extend from one side of the barrier wall to the other. A screw 77 secures one end of said strip and terminal clip 70 to each other and to block 66. When terminal block 66 is in position the reduced end 82 of barrier wall 80 extends into opening 42 and prevents access to the disconnect means in recesses 72.

The disconnect means 74 for each side of the companion metered line comprises a screwthreaded stud 84 which is electrically connected to the conductor strip 76 and also secures the adjacent end thereof to the terminal block 66. A terminal strip 86 has an offset end portion 87 provided with an opening 88 (Fig. 8) through which stud 84 projects, opening 88 having a larger diameter than that of stud 84 so that it does not have an electric connection directly with said stud. Strip 86 is insulated from strip 76 by a layer 90 of insulation material. A nut 92 is threaded on stud 84 and is engageable with strip 86 for making and breaking an electrical connection between strip 86 and stud 84 thereby to make and break an electrical connection between strip 86 and strip 76. Strip 86 is thus connected in series relation with a companion terminal 70 under the control of the disconnect means just described. Testing terminals 93 are screwed into companion strips 86 and thus secure said strips to the terminal block in engagement with the face of said block. Strip 86 extends through an opening 94 in the adjacent outer end of barrier wall 80 and is integral with a downwardly extending conductor strip portion 96 which is connected to a terminal member 98 provided with a conductor clamping screw 100. Terminal member 98 and the lower end of conductor strip 96 are secured to block 66 by a screw 102. It will be observed that terminals 98 of each terminal block 66 are located at the companion meter socket and are accessible therethrough, when the meter is dismounted from its socket, whereby it is unecessary, as heretofore, to open or unseal closure 44 of the disconnect means in order to obtain access to the terminals of the disconnect means to attach the outgoing lines thereto.

Terminal block 66 is provided with an opening 104 for the passage therethrough of a bolt 106 for securing said terminal block to supporting strap 50. Said bolt also extends through strap 46 of the meter socket and is provided with a nut 108 which is tightened against the front surface of said strap whereby said bolt clamps terminal block 66 in position and additionally secures plate 32 and the meter socket carried thereby to the panel unit. The intermediate wall portion 110 formed between recesses 72 separates the disconnect means in said recesses, respectively, from each other, said wall portion extending to the bottom of said recesses, and a barrier 112 formed on said block centrally thereof separates the two conductor strips 76 from each other.

Each panel unit has provision for mounting current responsive means in a compartment 114 at the upper end of the panel unit receptacle whereby the current responsive devices are located in line with and at one end of the row of meters of the panel unit. Said compartment is formed between the upper end wall 28 and a partition wall 116 fixed to the rear wall 24 and to the opposite side walls of the panel unit receptacle. The current responsive means may comprise any suitable devices. In the panel unit illustrated herein provision is made for utilizing fuses as the current responsive devices as indicated by the fuse sockets 118, one for each of the metered lines. Said fuse sockets are provided in an insulation block 120 mounted in compartment 114. Said block 120 is secured to rear wall 24 by screws 122 which pass through said block from the front thereof and through spacing members 124 and are threaded into the rear wall 24. A metal cover plate 126 is secured to the front of block 120 by nuts 128 threaded on the forward ends of screws 130 which project through block 120 from the back to the front thereof. Plate 126 is provided with an opening 132 for access to the fuse sockets in block 120. Said plate has forwardly bent side portions 134 which engage the opposite side walls 26, respectively, of the panel unit receptacle. Cover plate 126 closes the front of the compartment but permits access to the fuse sockets. A cover 136 is provided for each compartment 114, said cover being pivoted at its forward edge to upper end wall 28.

It will be observed that terminals 98 are located at the front of straps 48 and 50 so that the conductors connected to said terminals and leading to the current responsive devices in compartment 114 are separated by said straps from the branch bus bars or supply conductors 20 and 22. More particularly, as here illustrated, a line 138 leads from one terminal 98 of each terminal block 66 to a companion terminal 140 of a fuse socket. Lines 138 pass through an opening 142 in partition wall 116. The other terminal 144 of each fuse socket has connected thereto a line 146 which passes through an opening 148 provided in upper end wall 28, said last mentioned line passing directly or through box 18 for connection to the consumer's translating devices. The other side 139 of the metered line passes through openings 152 and 150 in end wall 28 and partition wall 116, respectively, and is connected to the other terminal 98 of the companion terminal block 66.

It will be understood that the meter panel can consist of one receptacle unit 12, which as here shown has a capacity of four metered lines, but which can have a smaller or a larger capacity, or the panel can comprise as illustrated in Fig. 1 a plurality of the panel units arranged in side by side relation. Thus, for example, as here shown, the panel comprises two groups of panel units, each group consisting of three panel units having their adjacent side walls connected to each other. Thus the capacity of the panel illustrated is 24 metered lines, there being 12 metered lines in each group and four metered lines in each panel unit. It is important to note that all of the metered lines in the panel units extend in the same direction, that is, longitudinally of their respective panel units and do not cross each other.

The panel units can be connected to each other in any sutable way as by riveting the side walls to each other preferably at the points to which the ends of straps 48 and 50 are secured to the side walls of their companion panel unit receptacle as indicated at 154 in Fig. 9. Thus, the panel units can be supplied by the manufacturer either individually or in groups of two or more connected to each other in unitary relation. It will be understood that each panel unit or a group of connected panel units can be provided with any suitable means for fastening said panel units to a support.

Thus, it is seen that the panel construction hereinbefore described is well adapted to accomplish the several objects of the present invention. It will be understood, however, that while I have shown and described the preferred embodiment of my invention the latter may be embodied otherwise than as herein specifically illustrated or described, and it will also be understood that in the above described construction certain changes in the details and in the arrangement of parts may be made and will occur to skilled artisans in view of the present disclosure. Therefore, I do not wish to be limited to the specific construction disclosed herein except to the extent which may be required by the scope of the appended claims.

This application is a division of my application for Meter Mounts, Ser. No. 587,808, filed April 11, 1945.

Having thus described my invention, what I claim and desire to secure by Letters Patent is:

1. In an electric-meter panel, a terminal block comprising a body of insulation material, meter terminals carried by said body, disconnect means carried by said body in spaced relation to said terminals, a barrier between said disconnect means and said terminals, electrical conductors passing through said barrier and connecting said terminals to said disconnect means, additional terminals carried by said block at the same side of said barrier as said meter terminals, said additional terminals and said meter terminals being closely adjacent to each other, and electrical conductors passing through said barrier and connecting said additional terminals to said disconnect means in series relation with said meter terminals.

2. In an electric-meter panel, a terminal block comprising a body of insulation material, meter terminals carried by said body at one side thereof, disconnect means carried by said body in spaced relation to said terminals at the other side of said body, said terminals being disposed laterally of said disconnect means, respectively, a barrier between said disconnect means and said terminals, electrical conductor strips passing through said barrier and extending laterally of said disconnect means, respectively, to connect said disconnect means and said terminals, respectively, additional terminals carried by said block at the same side of said barrier as said meter terminals and disposed laterally thereof, respectively, said additional terminals and said meter terminals being closely adjacent to each other, and electrical conductor strips passing through said barrier and disposed laterally of said first mentioned conductor strips, respectively, to connect said additional terminals to said disconnect means in series relation with said meter terminals.

3. In an electric-meter panel, a terminal block comprising a body of insulation material, meter terminals carried by said body at one side thereof, disconnect means carried by said body in spaced relation to said terminals at the other side of said body, said terminals being disposed laterally of said disconnect means, respectively, a barrier between said disconnect means and said terminals, electrical conductor strips passing through said barrier and extending laterally of said disconnect means, respectively, to connect said disconnect means and said terminals, respectively, additional terminals carried by said block at the same side of said barrier as said meter terminals and disposed laterally thereof, respectively, said additional terminals and said meter terminals being closely adjacent to each other, and electrical conductor strips passing through said barrier and disposed laterally of said first mentioned conductor strips, respectively, to connect said additional terminals to said disconnect means in series relation with said meter terminals, said disconnect means being separated by a portion of said body adjacent said barrier.

4. In an electric-meter panel, a terminal block comprising a body of insulation material, meter terminals carried by said body at one side thereof, disconnect means carried by said body in spaced relation to said terminals at the other side of said body, said terminals being disposed laterally of said disconnect means, respectively, a barrier between said disconnect means and said terminals, electrical conductor strips passing through said barrier and extending laterally of said disconnect means, respectively, to connect said disconnect means and said terminals, respectively, additional terminals carried by said block at the same side of said barrier as said meter terminals and disposed laterally thereof, respectively, said additional terminals and said meter terminals being closely adjacent to each other, and electrical conductor strips passing through said barrier and disposed laterally of said first mentioned conductor strips, respectively, to connect said additional terminals to said disconnect means in series relation with said meter terminals, said disconnect means being separated by a portion of said body adjacent said barrier, and a barrier extending between said first mentioned conductor strips from a point on said first mentioned barrier adjacent said portion.

5. In an electric-meter panel, a terminal block comprising a body of insulation material, meter terminals carried by said body, disconnect means carried by said body in spaced relation to said terminals, a barrier between said disconnect means and said terminals, electrical conductors passing through said barrier and connecting said terminals to said disconnect means, additional terminals carried by said block at the same side of said barrier as said meter terminals, and electrical conductors passing through said barrier and connecting said additional terminals to said disconnect means in series relation with said meter terminals, and testing terminals carried by said latter electrical conductors, respectively, said meter terminals comprising spring terminal clips.

6. A terminal block for an electric-meter panel, said block comprising a body of insulation material, said body having a pair of separated recesses defined therein adjacent one end thereof, a barrier extending about said recesses, and an additional barrier extending from said first mentioned barrier toward the other end of said body substantially centrally thereof, said first mentioned barrier having defined therein openings which communicate with said recesses, respectively, for the passage of electrical conductors through said first mentioned barrier.

7. A terminal block for an electric-meter panel, said block comprising a body of insulation material, said body having a pair of separated recesses defined therein adjacent one end thereof and extending transversely of said body, a barrier extending about said recesses, and an additional barrier extending longitudinally from a point on said first mentioned barrier intermediate said recesses toward the other end of said body substantially centrally thereof, said first mentioned barrier having defined therein at least one opening on each side of said point in communication with said recesses, respectively, for the passage of electrical conductors through said first mentioned barrier.

HELGE JENSEN.

REFERENCES CITED

The following references are of record in the file of this patent:

UNITED STATES PATENTS

| Number | Name | Date |
|---|---|---|
| 1,964,885 | Lewis | July 3, 1934 |
| 2,035,503 | Owens | Mar. 31, 1936 |
| 2,081,101 | Blakeslee | May 18, 1937 |
| 2,588,558 | Mosimann | Mar. 11, 1952 |